(12) United States Patent
Hwang et al.

(10) Patent No.: US 7,249,494 B2
(45) Date of Patent: Jul. 31, 2007

(54) BEAM TRACKING SYSTEM FOR SCANNING-PROBE TYPE ATOMIC FORCE MICROSCOPE

(75) Inventors: Ing-Shouh Hwang, Taipei (TW); Shao-Kang Hung, Taipei (TW); Li-Chen Fu, Taipei (TW); Ming-Yen Lin, Taipei (TW)

(73) Assignee: Academia Sinica (TW)

( * ) Notice: Subject to any disclaimer, the term of this patent is extended or adjusted under 35 U.S.C. 154(b) by 115 days.

(21) Appl. No.: 11/146,517

(22) Filed: Jun. 6, 2005

(65) Prior Publication Data

US 2006/0272398 A1    Dec. 7, 2006

(51) Int. Cl.
*G01B 5/28*    (2006.01)
*G01N 13/16*    (2006.01)
*G21B 21/20*    (2006.01)
*G21B 21/22*    (2006.01)

(52) U.S. Cl. ...................................................... 73/105
(58) Field of Classification Search .................. 73/105; 250/306
See application file for complete search history.

(56) References Cited

U.S. PATENT DOCUMENTS

| | | | | |
|---|---|---|---|---|
| 5,388,452 A | * | 2/1995 | Harp et al. | 73/105 |
| 5,440,920 A | * | 8/1995 | Jung et al. | 73/105 |
| 5,463,897 A | * | 11/1995 | Prater et al. | 73/105 |
| 5,467,642 A | * | 11/1995 | Hosaka et al. | 73/105 |
| 5,616,916 A | * | 4/1997 | Handa et al. | 250/234 |
| 5,825,020 A | * | 10/1998 | Hansma et al. | 250/216 |
| 5,850,038 A | * | 12/1998 | Ue | 73/105 |
| 6,998,602 B2 | * | 2/2006 | Kamps | 250/234 |

OTHER PUBLICATIONS

Hansma, P.K. et al., "A New, Optical-Lever Based Atomic Force Microscope", J. Appl. Phys., vol. 76, No. 2, Jul. 15, 1994, pp. 796-799.*
Jung, P.S. et al., "Novel Stationary-Sample Atomic Force Microscope with Beam-Tracking Lens", Electronic Letters, vol. 29, No. 3, Feb. 4, 1993, pp. 264-266.*
Kwon, J. et al. "Atomic Force Microscope with Improved Scan Accuracy, Scan Speed, and Optical Vision", Review of Scientific Instruments, vol. 74, No. 10, Oct. 2003, pp. 4378-4383.*
Nakano, K., "Three-Dimensional Beam Tracking for Optical Lever Detection in Atomic Force Microscopy", Review of Scientific Instruments, vol. 71, No. 1, Jan. 2000, pp. 137-141.*

* cited by examiner

*Primary Examiner*—Daniel S. Larkin
(74) *Attorney, Agent, or Firm*—Raymond J. Ho; Venable LLP

(57) ABSTRACT

Disclosed is a novel scanning-probe type atomic force microscope wherein false deflection of the probe is reduced. The probe of the scanning-probe type atomic force microscope moves in both the horizontal direction and the vertical direction during the scanning, while the sample is kept in order to reduce the false deflection brought to the probe due to the scanning motion, two approaches are adopted. The first is to have a focused laser spot tracking an invariant point on the probe's cantilever, which moves three-dimensionally during the scanning. The second approach is to have the laser beam, which is reflected from the moving cantilever, hitting an invariant point of the PSD, when the sample is distanced from the probe and induces no deflection. A beam tracking system wherein the scanning probe is located approximately at the focal point of an objective lens and he optical system including a laser source, an optical module, a feedback module and the probe are driven by an approach mechanism to move in synchronization.

9 Claims, 4 Drawing Sheets

BEAM TRACKING SYSTEM FOR SCANNING-PROBE TYPE ATOMIC FORCE MICROSCOPE

FIELD OF THE INVENTION

The present invention relates to an optical path design of scanning-probe type atomic force microscope, especially to a beam tracking system for scanning-probe type atomic force microscope. The present invention is especially useful in reducing the false deflection of the probe of the scanning-probe type atomic force microscope when the probe is moving at high speed in the three-dimensional space, whereby correct measurement results may be obtained.

BACKGROUND OF THE INVENTION

The atomic force microscope (AFM) may be used to produce three-dimensional images of a surface with the resolution of the nanometer level. There are two types of AFM. One is the "scanning-sample type" atomic force microscope and the other is the "scanning-probe type" atomic force microscope. In a scanning-sample type AFM, the sample is moved when it is scanned and the probe is kept stationary. Problems in moving or positioning the sample arise when the sample is large or heavy. In addition, temperature control, such as heating or cooling, of the sample may also affect the performance of the piezoelectric scanner of the AFM, which is provided beneath the sample. For samples in liquid cell, such as biomolecules, it is difficult to obtain correct images by using a scanning-sample type AFM, since samples move during the scan.

The scanning-probe type, or stationary sample type, AFM in which the probe scans the sample while the sample is kept stationary, is designed to solve the above problems. In order to achieve such a goal, one approach is to let the whole optical detecting system move along with the probe. However, the optical detecting module, including the laser diode (LD), the photo sensing device (PSD), the alignment mechanism and the frame structure that supports the optical configuration, is often too bulky and too massive to move with the scanner. Moving the whole module to scan the sample is proved not ideal. Many experts have tried to solve this problem by reducing the weight of the optical detecting module.

Another approach is the "tracking lens method" presented by Jung et al. See Jung et al., "Novel stationary-sample atomic force microscope with beam-tracking lens", Electron. Lett., Vol. 29, No. 3, pp. 264-266, 1993. Under such a design, however, the tracking error will limit the resolution of the microscope. For an ideal optical tracking system, when the laser beam emitted by he stationary laser diode perfectly tracks the moving probe, signals picked up by the photo sensing device shall reflect only the deflection of the probe, not the scanning motion. If the PSD signal varies during the scanning while deflection of the probe is null, false deflection or optical tracking error is generated.

In order to reduce the false deflection, a one-dimensional beam tacking method that makes the PSD move synchronously with the probe was introduced by Kwon et al. See Kwon e al., "Atomic force microscope with improved scan accuracy, scan speed and optical vision", Rev Sci. Instrum., Vol. 74, No. 10, pp. 4378-4383, 2003. Another solution was proposed by Hansma et al. to position a convex lens before the PSD to reduce false deflections. See Nansma et al., "A new, optical-level based atomic force microscope", J. Appl. Pys., Vol 76, No. 2, pp. 796-799, 1994. In these systems, however, the tracking function applies to false deflections in the horizontal directions but not in the vertical direction. A three-dimensional beam tracking system provided with tracking mirrors was later proposed by Nakano to compensate the false deflection. See K. Nakano, "Three-dimensional beam trucking for optical lever detection in atomic force microscope", Rev. Sci. Instrum., Vol. 71, No, pp. 137-141, 2000. In that system, the working distance from LD to the reflection point, of the probe changes during the scanning. However, the intensity signal of the beam varies if some portions of the beam fall-off the probe due to defocusing of the laser spot on the probe, whereby the shape of the reflected beam will be warped on the PSD and the PSD position signal will he adversely affected.

In addition, a special type of twist-probe was proposed, wherein a large mirror portion is provided to reduce the fall-off. Under such a design, its installation will readily limit one dimension of the image size. Another disadvantage of the twist-probe rests in that its distance to the PSD varies during the scanning, whereby constant relation between the probe deformation and the PSD signal can not be guaranteed.

OBJECTIVES OF THE INVENTION

The objective of this invention is to provide a novel light path system for scanning-probe type atomic force microscope.

Another objective of his invention is to provide a new beam tracking system for the scanning-probe type atomic force microscope.

Another objective of this invention is to provide a light path system for scanning-probe type atomic force microscope wherein both horizontal and vertical tracking errors may be reduced.

SUMMARY OF THE INVENTION

According to this invention, a novel scanning-probe type atomic force microscope is presented. The probe of the scanning-probe type atomic force microscope moves in both the horizontal direction and the vertical direction during the scanning, while the sample is kept stationary. In order to reduce the false deflection brought to the probe due to the scanning motion, two approaches are adopted in this invention. The first is to have the focused laser spot tracking an invariant point on the probe's cantilever, which moves three-dimensionally during the scanning. The second approach is to have the laser beam, which is reflected from the moving cantilever, hitting an invariant point of the PSD, when the sample is distanced from the probe and induces no deflection.

Although it is not intended to limit the scope of this invention by any theory, the present invention discloses a novel beam tracking system for a scanning-probe type atomic force microscope that satisfies the above requirements. The beam tracking system for the scanning-probe type atomic force microscope of this invention therefore comprises:

a base to carry a sample to be scanned;

a cantilevered probe to scan said sample in order to obtain topographic information representing a surface of said sample;

a laser source to generate laser beam;

an optical module to align and introduce said laser beam to said probe;

a feedback module, comprising a photo sensing device, to receive said laser beam reflected from said probe and to introduce said reflected laser beam to said photo sensing device;

a probe driving device to drive said probe to scan three-dimensionally;

an approach mechanism to drive said probe and to adjust the relative position of said probe and said sample; and an information processing module to pick up signals contained in said reflected laser beam as sensed by said photo sensing device and to convert said information into topographic information representing the surface of said sample;

wherein said optical module comprises an objective lens to focus said laser beam; said probe is located approximately at the focal point of said objective lens; and said laser source, said optical module, said feedback module and said probe are driven by said approach mechanism to move in synchronization.

According to the present invention, tracking errors in the horizontal and the vertical directions may be limited to from <0.3 nm over a 4 μm scanning distance to <12 μm over a 100 μm scanning distance.

These and other objectives and advantages of this invention may be clearly understood from the detailed description by referring to the following drawings.

DETAILED DESCRIPTION OF THE INVENTION

Figure 1:
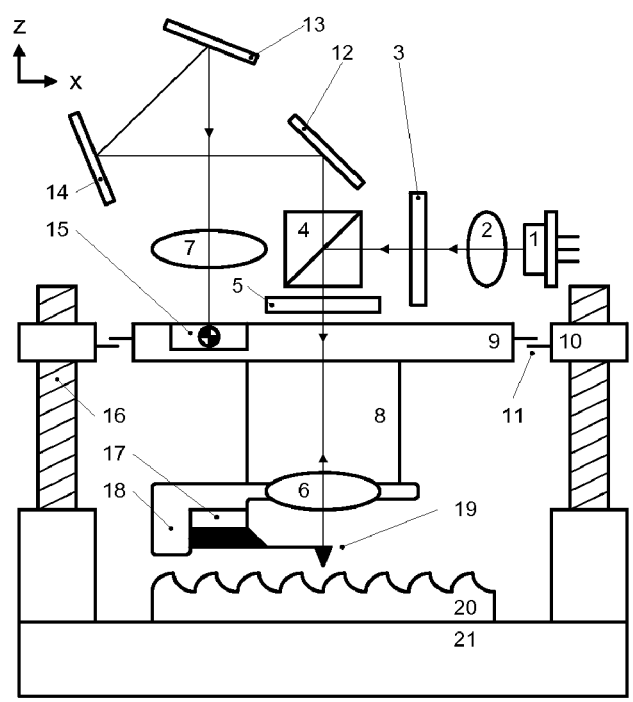
FIG. 1 shows the systematic diagram of the beam tracking system for the scanning-probe type atomic force microscope of this invention.

FIG. 1 shows the systematic diagram of the beam tracking system for the scanning-probe type atomic force microscope of this invention. As shown in this figure, the beam tracking system for the scanning-probe type atomic force microscope of this invention comprises a base unit, a laser source unit, an optical unit and a feedback unit. In these units, laser source 1 is used to generate a laser beam. The laser beam generated by laser source 1 is collimated by a collimation lens 2, polarized by a polarizer 3 and enters a beam splitter 4. The laser beam is then partially reflected and reaches the objective lens 6 through the ¼λ wave plate 5. The probe 19 is positioned at approximately the focal point of the objective lens 6, where the objective lens 6 focuses the laser beam at the probe 19. The laser beam reflected from the probe 19 contains deflection information of the probe 19. It reaches mirrors 12, 13 and 14 via objective lens 6, ¼ wave plate 5 and beam splitter 4, and is introduced to a photo sensing device 15 through a correction lens 7. The photo sensing device 15 picks up information contained in the laser beam and outputs to data processing module (not shown). The data processing module processes the information and generates results of scanning. The data processing module comprises a false deflection calculation means to calculate false deflection data of the probe 19 so that results of scanning may be calibrated using such false deflection data.

The photo sensing device 15 in general comprises 4 photo diodes to sense magnitude of incident light beam. Magnitude values of incident light beam as sensed by respective photo diodes may be used to determine the relative position of the probe and the hitting spot of the incident laser beam in the three-dimensional space. Results of such determination function as reference information representing deflection of the probe 19.

In this figure, 21 represents a base, on which a sample 20 to be scanned is positioned. The sample 20 has a topographic surface. During the scanning deflection of the probe 19 is caused by the force field between the tip of the probe and the surface of the sample. The deflection is sensed and fed into the data processing module to generate a feedback loop forcing the probe moving up and down in order to keep the tip-sample gap constant. With the deflection information, the samples topographic profile may be established. In a scanning-probe AFM, such as the present invention, the vertical scanning of the probe 19 is driven by the vertical tube scanner 8 and the piezoelectric oscillator 17, and the horizontal scanning is driven by the horizontal scanner 9. An approach mechanism 16 is provided on base 21. On the approach mechanism 16 fixed part 10 of the horizontal scanner 9 is supported to control the movement of the horizontal scanner 9 with the help of flexure guiding devices 11, 11. In addition, the probe 19 is supported by lens holder 18, so that the relative position of probe 19 and objective lens 6 is maintained constant.

An approach mechanism 16 is provided on base 21. On the approach mechanism 16 fixed part 10 of the horizontal scanner 9 is supported to control the movement of the horizontal scanner 9 with the help of flexure guiding devices 11, 11. In addition, the probe 19 is supported by lens holder 18, so that the relative position of probe 19 and objective lens 6 is maintained constant.

Vertical Tracking

As shown in FIG. 1, the probe 19 is installed at approximately focus of the objective lens 6. The relative position of probe 19 and objective lens 6 is thus kept constant by lens holder 18. The lens holder 18 may be prepared with a metal material, such as aluminum, and is attached to the bottom of the vertical scanner 8. The collimated laser beam is emitted by the laser diode 1, adjusted by a four-axis laser mount 22, and kept parallel to the up-and-down motion of the vertical scanner 8. The path of the laser beam may be adjusted by adjusting the angles of mirrors 12, 13 and/or 14. The laser beam reflected from the probe 19 is collimated by the objective lens 6 and adjusted by mirrors 12, 13 and 14 to aim at the center of the photo sensing device 15. The relative position of the optical module and the probe remains invariant during the Z-direction movement. In other words, the tracking function in the vertical direction is exactly achieved by the objective lens 6, which moves in synchronization with the optical module. As shown in the figure, the incident laser beam is focused by the objective lens 6 to its focal point and the probe 19 is positioned at the focal point of the objective lens 6. Since the objective lens 6 moves in synchronization with the probe 19, the focused laser beam may track an invariant point on the probe 19 at all times. In addition, it is possible to provide a piezoelectric oscillator 17 to perform tapping mode of the AFM.

Theoretically, there should be no vertical tracking errors. However, due to the imperfection of the optical elements and the mechanical misalignment of the optical system, it can not be totally eliminated. Such tracking errors, however, may be calibrated through applicable inspection and calibration procedures.

Horizontal Tracking

In the data processing module of the beam tracking system for the scanning-probe type atomic force microscope of this invention, a false deflection calculation means is provided to calculate false deflection in the horizontal direction of the probe 19.

Figure 2:
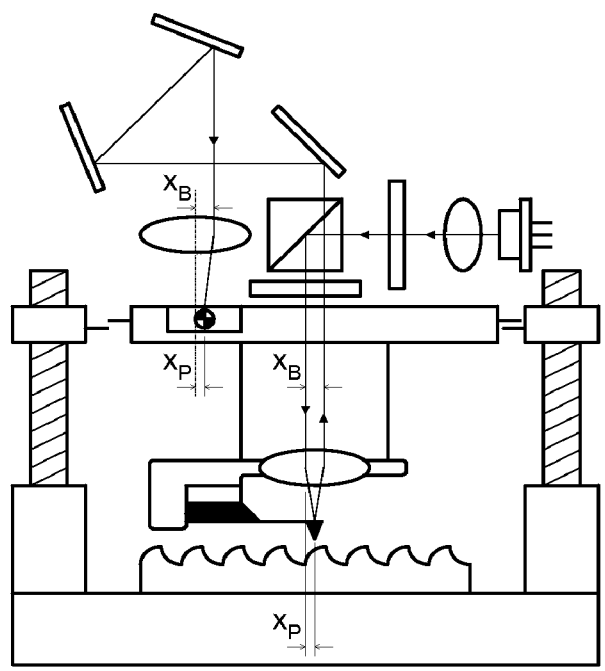
FIG. 2 shows the optical configuration of the invented beam tracking system for the scanning-probe type atomic force microscope during X direction scanning.
Figure 3:
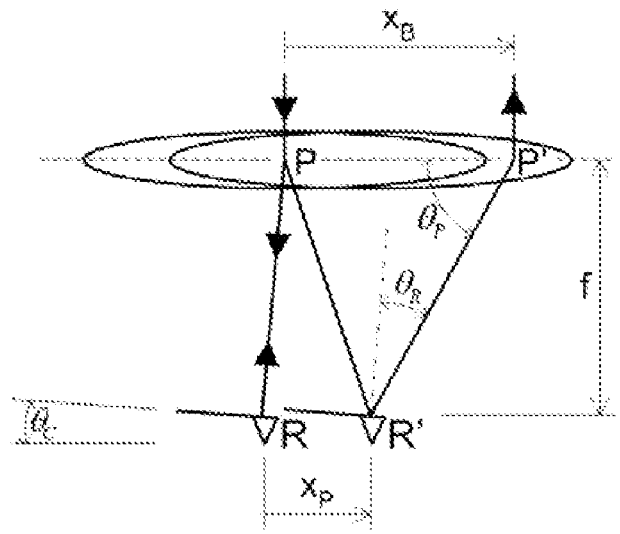
FIG. 3 shows the optical configuration around the probe of the invented beam tracking system for the scanning-probe type atomic force microscope.

Variation of the optical configuration of the optical system of this invention during X-direction or Y-direction scanning is shown in FIG. 2. FIG. 2 shows the optical configuration of the invented beam tracking system for scanning—probe type atomic force microscope during X direction scanning. As shown in this figure, when probe 19 shifts by distance $x_P$, the incident beam and the reflected beam do not remain coaxial. The distance between their centers is called beam shift, denoted as $x_B$, which is roughly twice of $x_P$. FIG. 3 shows the optical configuration around the probe of the invented beam tracking system for scanning-probe type atomic force microscope. In this figure, $\theta_C$ represents tilt angle of the probe 19 that helps to guarantee the lowest point of the probe 19 is its tip. Generally speaking, a feasible tilt angle of the probe 19 is approximately 10-15° and is 12° in this embodiment. Moreover, f is the length of the objective lens 6, which is 9 mm in this embodiment. R denotes position of the probe when the incident beam and the reflected beam are coaxial.

As shown in this figure, when probe 19 is shifted from position R to position R', with the distance of $X_P$, the reflected beam moves from position P to position P', with the distance of $X_B$. The mathematical relation between $x_B$ and $x_P$ may be described by equation (1), as follows:

$$X_B(X_P) = \sqrt{f^2 + (X_P - f\tan\theta_C)^2} \cdot \frac{\sin(2\theta_R(X_P))}{\sin(\theta_P(X_P))} \quad (1)$$

$$\theta_R(X_P) = \theta_C + \tan^{-1}\left(\frac{X_P}{f} - \tan\theta_C\right),$$

wherein $$\theta_P(X_P) = \frac{\pi}{2} - 2\theta_C - \tan^{-1}\left(\frac{X_P}{f} - \tan\theta_C\right).$$

Therefore, $X_B(X_P) = C \cdot X_P + X_B(X_0) \quad (2)$ wherein C is constant and $X_0$ is mechanical misalignment.

If displacement of the laser beam and displacement of the probe 19 were equal (i.e. $x_B = x_P$), the correction lens 7 would not be needed. The motion of the synchronized photo sensing device could eliminate the false deflection automatically. However, $X_B$ is only roughly twice of $X_P$. Fortunately, the relation between them is approximately linear. Taking the example where range of the horizontal scanning is 100 μm, and misalignment of the optical system x0 is 1 mm (i.e. xp travels from 0.95 mm to 1.05 mm), linear approximation as described in equation (2) may be instead of (1) to compensate (the false deflection. The linear compensation may be realized by installing the correction lens 7 at a distance of $f_C/C$ above the photo sensing device 15, wherein $f_C$ is the focal length of correction lens 7 and C is the same as above.

Figure 4:
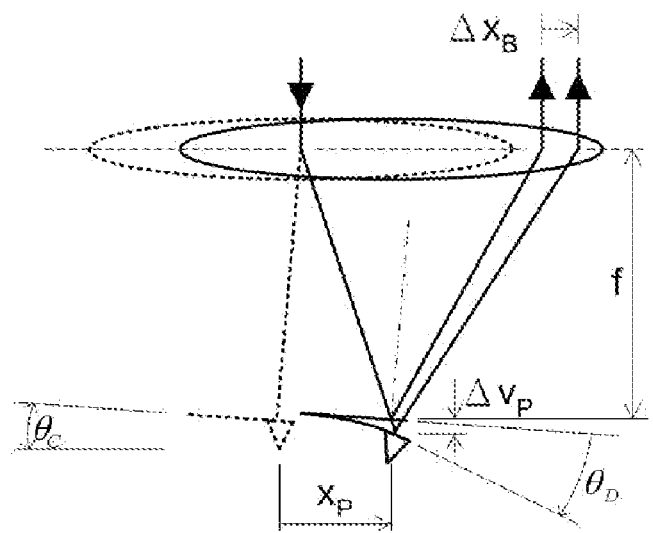
FIG. 4 shows the relation between deflection of the probe $V_P$ and deviation of the laser beam $X_B$.
Figure 5:
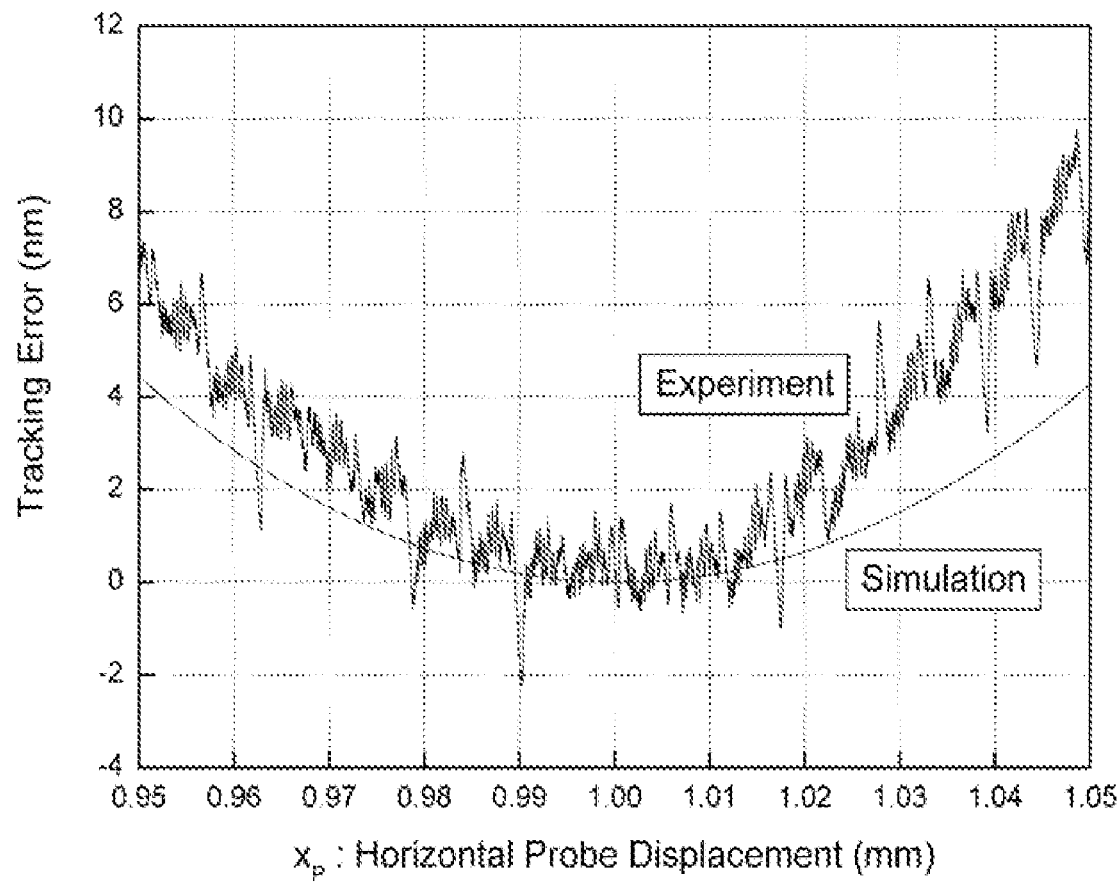
FIG. 5 shows the relation between tracking errors in the horizontal direction and horizontal displacement of the probe in one embodiment of the beam tracking system for the scanning-probe type atomic force microscope of this invention.

FIG. 4 shows the relation between deflection of the probe $V_P$ and deviation of the laser beam $S_B$. As shown in this figure, the difference between $X_B$ and $X'_B$ is $\Delta X_B$ and may be used to calculate false deflection $\Delta\nu_P$, according to the following equation (3): $\Delta\upsilon_P = L3 \cdot f \cdot \Delta X_B$ (3) wherein L, is the length of the cantilever and is 0.45 mm in this embodiment. This equation may also describe the optical-level effect. False deflection in the horizontal direction resulted from such structure is shown in FIG. 5. FIG. 5 shows the relation between tracking errors in the horizontal direction and horizontal displacement of the probe in this embodiment. As shown in this figure, when the scanning distance is 100 μm, the tracking error in the horizontal direction is 12 nm.

In short, during the horizontal scanning, the non-linear error is represented by Equation (1). The correction lens 7 is helpful to linearly compensate such a non-linear error, which behavior is represented by Equation (2). Such linear compensation may eliminate most false deflection. The residual minor false deflection $\Delta\nu\rho$ may be easily measured by experiments, as shown in FIG. 5.

The false deflection calculation means of this invention calculates the false deflection $\Delta\nu\rho$ according to Equation (3). The resulted information is then used by the data processing unit to calibrate or correct the topographic information of the sample.

Besides the imperfection of the optical elements and the mechanical misassemble, the out-of-plane motion of the horizontal scanner may also contribute to the errors. Such errors, however, may be off-line measured and subtracted from the acquired image.

Figure 6:
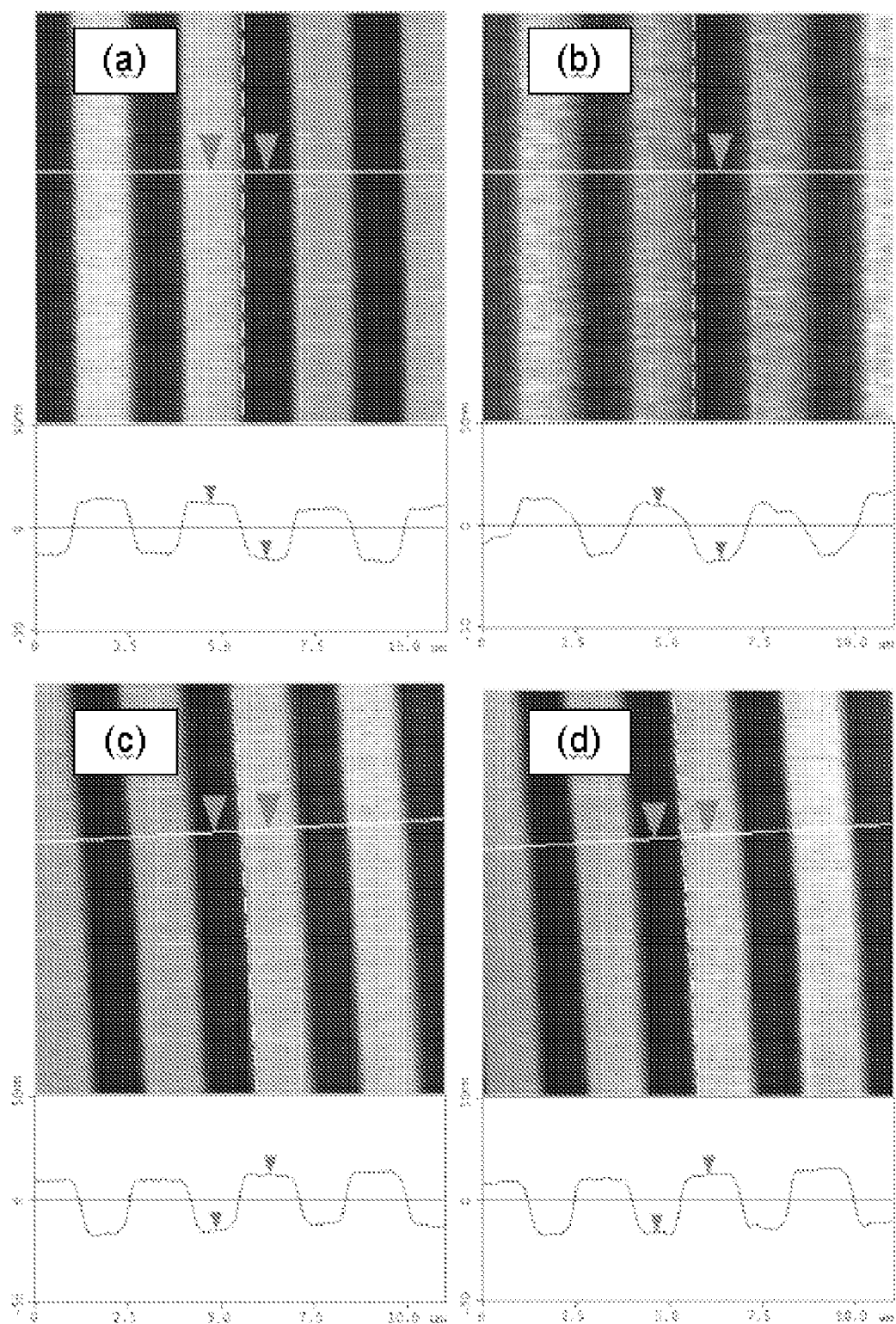
FIG. 6 shows four AFM topographs and height profiles of a standard grating, as scanned by the scanning-probe type atomic force microscope of this invention and of the conventional art, wherein (a) is topography scanned by a conventional scanning-sample AFM carry a 51 g brass block and scanning at 5 μm/s in the horizontal direction, (b) is topography scanned by the same AFM carrying the same brass block at 50 μm/s speed, (c) and (d) are topographs scanned by the invented AFM carrying the same brass block and scanning at 5 μm/s and 50 μm/s speeds, respectively.

FIG. 6 shows four AFM topographs and height profiles of a standard grating, as scanned by the scanning-probe type atomic force microscope of this invention and of the conventional art. In this figure, (a) is topography scanned by a conventional scanning-sample AFM carrying a 51 g brass block and scanning at 5 μm/s in the horizontal direction, (b) is topography scanned by the same AFM carrying the same brass block at 50 μm/s speed, (c) and (d) are topographs scanned by the invented AFM carrying the same brass block and scanning at 5 μm/s and 50 μm/s speeds, respectively.

In the experiments of FIG. 6, the specimen is a standard grating with a step height of 26±1 nm and the horizontal pitch of 3±0.1 μm. The specimen is attached on the brass block to simulate a heavy sample. The experiments demonstrate the performance of the beam tracking system for the scanning-probe type atomic force microscope of this invention. As shown in FIG. 6, in the conventional art the vertical scanner was not able to follow the fast variation of the surface topography of the sample and distortion in the height profile is induced. In contrast, the present invention performs well without image distortion even at higher scanning speed.

According to the present invention, tracking errors in the horizontal and the vertical directions may be limited to from <0.3 nm over a 4 μm scanning distance to <12 nm over 100 μm scanning distance.

As the present invention has been shown and described with reference to preferred embodiments thereof, those skilled in the art will recognize that the above and other changes may be made therein without departing from the spirit and scope of the invention.

What is claimed is:

1. A beam tracking system for a scanning-probe type atomic force microscope, comprising:
    a base to carry a sample to be scanned;
    a cantilevered probe to scan said sample in order to obtain topographic information representing a surface of said sample;
    a laser source to generate a laser beam;
    an optical module to align and introduce said laser beam to said probe;
    a feedback module, comprising a photo sensing device, to receive a reflected laser beam reflected from said probe and to introduce said reflected laser beam to said photo sensing device;
    a probe driving device to drive said probe to scan three-dimensionally;
    an approach mechanism to drive said probe and to adjust the relative position of said probe and said sample; and
    an information processing module to pick up signals contained in said reflected laser beam as sensed by said photo sensing device and to convert said signals into topographic signals representing the surface of said sample;
    wherein said optical module comprises an objective lens to focus said laser beam;
    said probe is located approximately at the focal point of said objective lens;
    and said laser source, said optical module, said feedback module and said probe are driven by said approach mechanism to move in synchronization.

2. The beam tracking system for a scanning-probe type atomic force microscope according to claim 1, further comprising a correction lens positioned above said photo sensing device to linearly compensate said reflected laser beam.

3. The beam tracking system for a scanning-probe type atomic force microscope according to claim 2, wherein said information processing module further comprises a false deflection calculation means to calculate false deflection ($\Delta v_\rho$) of said probe according to the to the following equation:

$$\Delta v_P = \frac{L}{3f} \Delta X_B \qquad (3)$$

wherein L is length of cantilever of said probe, f is focal length of said objective lens and $\Delta v_B$ is shift distance of probe during scanning.

4. The beam tracking system for a scanning-probe type atomic force microscope according to claim 3, wherein said probe driving device comprises a vertical scanning driver and a horizontal scanning driver.

5. The beam tracking system for a scanning-probe type atomic force microscope according to claim 3, wherein the relative position between said probe and said objective lens is maintained constant by a lens holder.

6. The beam tracking system for a scanning-probe type atomic force microscope according to claim 2, wherein said correction lens locates above said photo sensing device at a distance of $f_c/C$, wherein $f_c$ is the focal length of said correction lens and C is a constant.

7. The beam tracking system for a scanning-probe type atomic force microscope according to claim 1, wherein said information processing module further comprises a false deflection calculation means to calculate false deflection ($\Delta v_\rho$) of said probe according to the following equation:

$$\Delta v_P = \frac{L}{3f} \Delta X_B \qquad (3)$$

wherein L is length of cantilever of said probe, f is focal length of said objective lens and $\Delta X_B$ is shift distance of probe during scanning.

8. The beam tracking system for a scanning-probe type atomic force microscope according to claim 7, wherein said probe driving device comprises a vertical scanning driver and a horizontal scanning driver.

9. The beam tracking system for a scanning-probe type atomic force microscope according to claim 7, wherein the relative position between said probe and said objective lens is maintained constant by a lens holder.

* * * * *